US008340532B2

(12) United States Patent
Miyasaka et al.

(10) Patent No.: US 8,340,532 B2
(45) Date of Patent: Dec. 25, 2012

(54) OPTICAL SIGNAL RECEIVING APPARATUS

(75) Inventors: Eita Miyasaka, Yokohama (JP); Koji Takatori, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 355 days.

(21) Appl. No.: 12/792,012

(22) Filed: Jun. 2, 2010

(65) Prior Publication Data

US 2011/0020012 A1 Jan. 27, 2011

(30) Foreign Application Priority Data

Jun. 19, 2009 (JP) ................................ 2009-146329

(51) Int. Cl.
*H04B 10/06* (2006.01)

(52) U.S. Cl. ...................................................... 398/202

(58) Field of Classification Search ........... 398/202–214
See application file for complete search history.

(56) References Cited

U.S. PATENT DOCUMENTS 7,103,279 B1 * 9/2006 Koh et al. ..................... 398/115
2006/0062581 A1 * 3/2006 Liu et al. ....................... 398/183
2009/0317092 A1 * 12/2009 Nakashima et al. .......... 398/204

FOREIGN PATENT DOCUMENTS

JP 2007-288702 A 11/2007
JP 2008-28559 A 2/2008

OTHER PUBLICATIONS

Interfaces for the Optical Transport Network (OTN), ITU-T G.709/Y.1331 (Dec. 2009).

* cited by examiner

*Primary Examiner* — Leslie Pascal
(74) *Attorney, Agent, or Firm* — Mattingly & Malur, PC

(57) ABSTRACT

A simple synchronizing detection circuit is provided in each of logical operation circuits, and a method for making a synchronizing detection in parallel is adopted. A selector control section monitors the states of the simple synchronizing detection circuits in parallel, and supplies an output from a proper logical operation circuit detecting the synchronization establishment to a frame synchronizing/terminating circuit at the latter stage. There is provided a function of relieving a synchronization determination condition if the synchronization establishment is not detected in any of the synchronizing detection circuits, whereby the output from the proper logical operation circuit can be selected depending on a load on a transmission path.

14 Claims, 18 Drawing Sheets

| Input pattern example | Logical operation circuit | Odd number bit inversion | Even number bit inversion | One bit shift | Bit swap | Post-operation pattern |
|---|---|---|---|---|---|---|
| 0xf628<br>1111 0110 0010 1000 | a | 0 | 0 | 0 | | 1111011000101000 |
| | b | 0 | 0 | 0 | 1 | 1111100100010100 |
| | c | 0 | 0 | 1 | 0 | 1101110010100000 |
| | d | 0 | 0 | 1 | 1 | 1110110001010000 |
| | e | 0 | 1 | 0 | 0 | 1010001101111101 |
| | f | 0 | 1 | 0 | 1 | 0101001110111110 |
| | g | 0 | 1 | 1 | 0 | 1000100111110101 |
| | h | 0 | 1 | 1 | 1 | 0100011011111010 |
| | i | 1 | 0 | 0 | 0 | 0101110010000010 |
| | j | 1 | 0 | 0 | 1 | 1010110001000001 |
| | k | 1 | 0 | 1 | 0 | 0111011000001010 |
| | l | 1 | 0 | 1 | 1 | 1011100100000101 |
| | m | 1 | 1 | 0 | 0 | 0000100111010111 |
| | n | 1 | 1 | 0 | 1 | 0000011011101011 |
| | o | 1 | 1 | 1 | 0 | 0010001101011111 |
| | p | 1 | 1 | 1 | 1 | 0001001110101111 |
| | | 0: invalid , 1: valid | | | | |

FIG. 11

OPTICAL SIGNAL RECEIVING APPARATUS

CLAIM OF PRIORITY

The present application claims priority from Japanese patent application JP 2009-146329 filed on Jun. 19, 2009, the content of which is hereby incorporated by reference into this application.

BACKGROUND OF THE INVENTION

1. Field of the Invention

The present invention relates to an optical signal receiving apparatus, and more particularly to an optical signal receiving apparatus of a multi-valued phase modulation method for modulating an optical phase in multi-values, which can be decoded into a proper electric signal array in a short time.

2. Description of the Related Art

In recent years, an access network has rapidly progressed for opticalization, and various information communication services using such large-capacity access network go on increasing. With increased demands for large-capacity data communication on both aspects of hardware and software, there is a growing request for higher bit rate of the optical fiber communication.

However, various problems arise with the higher bit rate of the optical fiber communication. First of all, with the higher bit rate of the optical fiber communication, it is required to correspondingly increase the operation rate of an electrical device and an optical device in a transmitting and receiving apparatus. At present, an Intensity Modulation-Direct Detection (IM-DD) method that is a main stream of the optical fiber communication is one of directly replacing ‘0’ and ‘1’ of an electric signal with OFF and ON of light in a transmitter and reproducing again ‘0’ and ‘1’ of the electric signal in a receiver. Accordingly, in trying to improve a signal of 10 Gbits/sec in the main stream at present for the high speed transmission of, e.g., 40 Gbits/sec, it is required that the operation speed of an optical device such as laser or photodiode, or an electric device such as an electric amplifier or discriminator for driving them is quadrupled. The electric or optical device operating at 40 Gbits/sec has a significant problem with the material or manufacturing cost, in addition to some technical problems.

Along with the higher bit rate of the optical fiber communication, an optical waveform is deteriorated due to wavelength dispersion or polarization dispersion characteristics in the optical fiber, so that a transmission speed or a transmission distance is restricted. The transmission distance with the wavelength dispersion limitation is inversely proportional to the square of transmission bandwidth, and for example, if a signal of 10 Gbits/sec is changed in speed to 40 Gbits/sec, the distance is reduced to one-sixteenth. On the other hand, the transmission distance with a polarization dispersion limitation is inversely proportional to the transmission bandwidth, and similarly, if a signal of 10 Gbits/sec is changed in speed to 40 Gbits/sec, the distance is reduced to one-fourth.

Further, the higher bit rate increases the occupied signal bandwidth. For example, in trying to quadruple the bit rate, the occupied signal bandwidth, namely, the occupied optical spectrum width is also quadrupled. In an attempt to realize large-capacity transmission by making the multi-channel of optical signals in a wavelength direction as in the wavelength division multiplexing (WDM) transmission, the bandwidth is restricted by the amplification bandwidth of a light amplifier that collectively amplifies the wavelength multiplexing signals. That is, considering that the wavelength is set so that the wavelength multiplexing signals may not overlap, it is required that the product of the occupied spectrum width and the wavelength number is in an amplification band of this light amplifier. Since the amplification band is fixed, it is required that the wavelength number is decreased if the occupied spectrum width is increased, whereby even if the bit rate is increased, the spectrum width is expanded correspondingly, and the wavelength number is decreased, and after all the total capacity is unchanged, so that it is restricted to increase the capacity.

As a method for realizing a higher bit rate by abolishing the limitation of such a device response speed, restriction due to wavelength dispersion or polarization dispersion and restriction by increased spectrum width, an optical multi-valued modulation is noteworthy. The optical multi-valued modulation is a technique for increasing the total transmission capacity log M times (the base of logarithm is 2), without increasing the bit rate of a modulation drive signal, by modulating the optical intensity or optical phase, or both in M values (M>2). More specifically, in the case of forming a signal of 40 Gbits/sec, for example, a drive signal of 40 Gbits/sec is required in the conventional binary transmission. On the other hand, the transmission capacity can be increased log 4 times=twice in quaternary transmission, and if a drive signal of 20 Gbits/sec is provided in two systems, the transmission of 40 Gbits/sec can be realized. Similarly, since the transmission capacity can be increased threefold in eight-valued transmission, the transmission capacity can be quadrupled in sixteen-valued transmission with three systems of a signal of about 13 Gbits/sec, whereby the transmission of 40 Gbits/sec can be realized with four systems of a signal of 10 Gbits/sec.

Also, in the transmission using such an optical multi-valued modulated signal, the wavelength dispersion, polarization dispersion and occupied spectrum width are restricted by the rate of these drive signals, whereby the signal of 40 Gbits/sec formed by two systems of the signal of 20 Gbits/sec can be increased fourfold in the wavelength dispersion limited distance, and twice in the polarization dispersion limited distance, and further reduced to one-half in the occupied spectrum width as compared with the signal of 40 Gbits/sec in the conventional binary transmission.

Among the optical multi-valued modulations, especially a quaternary phase modulation (DQPSK: Differential Quaternary Phase Shift Keying) in which the optical phase is modulated in four values is noteworthy, because of the advantages of the easiness of managing the interval of each level constantly and the higher sensitivity due to the phase modulation.

FIG. 1 is a configuration diagram of a quaternary phase modulation transmitter. FIG. 2 is an explanatory view of an extinction characteristic for an MZ type modulator. FIG. 3 is an explanatory view of an example of phase modulation in the MZ type modulator.

The principle of a typical method for forming a quaternary phase modulated signal will be described below using FIG. 1. A signal light outputted from a light source (1) is split into two by a band splitter (2). The two split signal lights reach the phase modulators A, B (3A, 3B). An electric signal in which a bias voltage 1A (6A) is superimposed on a data signal A (7A) by a bias superimposing unit (8A) is applied to a phase modulator A. With this electric signal, an optical signal entering the phase modulator A (3A) is subjected to binary phase modulation and outputted.

This behavior will be described below using FIGS. 2 and 3. A Mach Zehnder (MZ) interferometer is generally employed for this phase modulator. An output characteristic (extinction characteristic) of the MZ type modulator is shown in FIG. 2. If the applied voltage (transverse axis) of the MZ type modulator is changed, the output (longitudinal axis) from the modulator traces a locus similar to a sinusoidal wave as shown in FIG. 2. A voltage required for the extinction characteristic to vary from trough to crest is defined as Vπ, which is a main parameter representing the characteristic of the modulator.

Herein, a case wherein a binary electric waveform having an amplitude of 2Vπ around the trough of the extinction characteristic (in which the bias voltage is made coincident with the trough of the extinction characteristic) is applied to this modulator is considered, as shown in FIG. 3. Because of modulation from crest to crest of the extinction characteristic, the output of the modulator has a waveform of once falling from crest to trough and rising to crest again. That is, the output is always located at the crest at the center of bit, with a constant amplitude. However, there is a characteristic that the phases of the output light are different from each other by π at the adjacent crests in the extinction characteristic of the MZ type modulator. In view of this characteristic, an input electric waveform '0' is converted into an output light having amplitude '1' and phase '0', and an input electric waveform '1' is converted into an output light having amplitude '1' and phase 'π'. That is, a binary phase modulated signal having the fixed amplitude and the phase '1' or 'π' is formed.

FIG. 4 is an explanatory view of an example of a phase state in a quaternary phase modulator.

The phase state at point A in FIG. 1, or in the output of the phase modulator A (3A), is shown in FIG. 4. Each graph of FIG. 4 represents the phase on the complex plane with the I-axis and the Q-axis, in which the I-axis indicates the amount of in-phase component and the Q-axis indicates the amount of orthogonal component. Also, if any signal point on a coordinate axis is arranged, the distance from the origin to a signal point represents the amplitude of the signal. Also, the angle between a line connecting from the origin to the signal point and a line connecting from the origin in the positive direction of the I-axis represents the phase of the signal. The phase state at point A is arranged at two points on the I-axis in symmetry of the origin. That is, the data signals having amplitude '0' and '1' are transformed into two points having phase '0' and 'π', respectively.

Similarly, an electric signal in which a bias voltage 1B (6B) is superimposed on a data signal B (7B) by a bias superimposing unit (8B) is applied to a phase modulator B. With this electric signal, an optical signal entering the phase modulator B (3B) is subjected to binary phase modulation and outputted. The phase state at point B, or in the output of the phase modulator B (3B), is arranged at two points on the I-axis in symmetry of the origin, like point A, as shown in FIG. 4. That is, the data signals having amplitude '0' and '1' are transformed into two points having phase '0' and 'π', respectively.

Further, a phase shifter (4) is installed at the output of one of the two phase modulators, or the phase modulator B (3B), to adjust the phase to be shifted by π/2 by applying a constant bias voltage 2. As a result, the phase states at points C and D are different from each other, as shown in FIG. 4. The phase state at point D is moved to two points arranged on the Q-axis in symmetry of the origin, because each signal point is rotated by π/2.

The output of the phase modulator A (3A) and the output of the phase shifter (4) are synthesized by a wave synthesizer (5). The output of the wave synthesizer (5), namely, the phase state of the signal point at point E is shown in FIG. 4. The signal points, at the time before wave synthesis, correspond to four points as indicated by a small circle of the broken line in FIG. 4, but as a result of wave synthesis by the wave synthesizer (5), the signal point obtained by making the electric field synthesis, or geometrical vector synthesis, of these four points is outputted. That is, assuming that the state of data A and the state of data B are represented by 'x' and 'y', respectively, the signal point when data A is '0' and data B is '1', namely, in the case of "01", is arranged in the fourth quadrant of the coordinate system. Similarly, the points of "00", "10" and "11" are arranged in the first, second and third quadrants, respectively. In this way, the quaternary phase modulated signal having four phase levels of +π/4, +3π/4, −3π/4 and −π/4 is formed.

With the above method, in the case where the signal of 40 Gbits/sec is subjected to quaternary phase modulation, two systems for the signal of 20 Gbits/sec are decomposed for the data signals X·Y, and the combinations of the data signals X·Y in these two systems are implemented by applying the phase levels corresponding to "01", "00", "10" and "11". Actually, in a sending pre-coder (9), a pre-code process for converting A·B into X·Y is performed so that the detected signals in two systems may become desired A·B data in decoding in an optical receiver as will be described later.

FIG. 5 is a configuration diagram of a quaternary phase modulation receiver.

An optical receiving component for demodulating the signal subjected to quaternary phase modulation will be described below using FIG. 5. A received optical signal (10) is split at 1:2 by a band splitter (11), so that the optical signals after splitting are inputted into one-bit delay interferometers A, B (12A, 12B). Herein, each of the interferometers A, B (12A, 12B) is typically composed of an MZ interferometer. The delay interferometers A and B (12A, 12B) have an interference characteristic having a phase difference of π/2, and are employed to extract the orthogonal phase components in FIG. 4. Each of the one-bit delay interferometers A, B (12A, 12B) has a one-bit delay element, whereby each input signal interferes with the signal before one bit. For example, if the phase difference from the signal before one bit is '0', the optical signal with an intensity of '1' is produced by interference. On the other hand, if the phase difference from the signal before one bit is 'π', the optical signal with an intensity of '0' is produced by interference. In this way, the phase component applied to the optical signal becomes the modulated signal with intensity '0' or '1' through the one-bit delay interferometer A, B (12A, 12B), and is converted into an electric signal in a balance photo-diode (13A, 13B) for the two systems at the latter stage. The signals extracted from the balance photo-diodes (13A, 13B) for the two systems through the pre-code process on the sending side as previously described are decoded as the signals A·B of 20 Gbits/sec that run one after another.

The signals converted into the electric signals by the respective balance photo-diodes are decoded in clock and data recovery (CDR) circuits (14A, 14B), multiplexed in a multiplexer (15), and decoded into a serial electric signal of 40 Gbits/sec. Then, the electric signals are parallelized in accordance with the operation speed of the latter stage circuit by a serial to parallel converter (16), and subjected to termination of an OTN frame, error correction, and extraction of a payload area (transmitted signal information) in an OTN framer (17) at the latter stage. Herein, as a method for mapping the signal information to a fixed-length frame, an Optical Transport Network (OTN) frame as defined in the ITU-T G.709 (Interfaces for the Optical Transport Network (OTN)) is exemplified, although the mapping method is not limited to the OTN frame as long as it has the fixed-length frame.

Also, as the related art, an optical signal receiving apparatus for receiving and demodulating an optical signal subjected to DQPSK modulation, comprising a parallelization section for parallelizing the multiplexed signals by inputting a DQPSK optical signal and a logical processing circuit for making a logical inversion process, a bit delay process and a bit swap process, correspondingly to a reception state at the parallelization timing in the parallelization section was described in JP-A-2007-288702 and JP-A-2008-28559. Also, ITU-T G.709 Interfaces for the Optical Transport Network (OTN) discloses a related art of the invention.

SUMMARY OF THE INVENTION

Electric signals decoded from the balance photo-diodes (13A, 13B) for two systems are extracted with a phase difference from the signal before one bit, as previously described, and do not indicate the intensity itself of the applicable signal, but have the relative value with the same value as the preceding bit or its inversion value.

Also, in serializing the electric signals decoded from the balance photo-diodes (13A, 13B), there is no means for identifying the context between the electric signal A decoded from the balance photo-diode A (13A) and the electric signal B decoded from the balance photo-diode B (13B) at the time of serialization in the multiplexer (15).

Accordingly, a general method involves establishing a frame synchronization through a process for collating electric signals parallelized in the multiplexer (15) and the serial to parallel converter (16) with a specific signal pattern, and selecting a matched condition.

However, with the related art, especially when the signal mapped to the OTN frame is restricted in the switching time between the operation system and the stand-by system like an SONET/SDH, a delay taken to establish the synchronization may often cause a failure.

In the light of the above-mentioned problems, an object of the invention is to securely establish the frame synchronization and shorten the time taken to establish the synchronization.

In order to solve the above-mentioned problems with the multi-valued modulation method such as a DQPSK, the invention comprises a simple synchronizing detection circuit in each of a plurality of (e.g., four or sixteen) logical operation circuits, and adopts a method for making the synchronizing detection in parallel.

According to the solving means of this invention, there is provided an optical signal receiving apparatus comprising:

a serial to parallel conversion section for parallelizing an electric signal array generated from an optical signal received and subjected to multi-valued phase modulation;

a bit separation circuit for separating the electric signal array parallelized by the serial to parallel conversion section into an odd number part and an even number part;

a slitter section for splitting each of the odd number part and the even number part outputted from the bit separation circuit into plural;

a plurality of logical operation circuits for making a logical operation on the odd number part and the even number part after splitting outputted from the splitter section;

a plurality of synchronizing detection circuits for detecting the detection state of a fixed pattern in parallel by comparing the output of each of the plurality of logical operation circuits with the fixed pattern for frame synchronization extracted from the received optical signal;

a selector for selecting the output from any of the plurality of synchronizing detection circuits; and a selector control section for controlling the selector to output a signal array outputted from the synchronizing detection circuit when detecting a notification of the detection state of the fixed pattern from the one synchronizing detection circuit.

With this invention, by detecting an appropriate bit array for an electric signal once decoded in the logical operation circuits and the simple synchronizing detection circuits which are in parallel, it is possible to establish a pattern synchronizing state even in decoding the multi-valued modulation at the same speed and accuracy as the binary modulation. Also, with the invention, it is possible to perform an appropriate decoding process according to an extent of signal degradation due to a load in an optical transmission path (such as loss, wavelength dispersion and polarization dispersion according to transmission path length) by varying a simple synchronizing establishment condition. Further, with the invention, even when a bit array decoded in a photo-diode is changed according to a transient change of the optical transmission path load, it is possible to redetect an appropriate bit array in the simple synchronizing detection circuit and decode a signal without causing an out of frame in the synchronizing detection circuit at the latter stage.

BRIEF DESCRIPTION OF THE DRAWINGS

FIG. 11 is a view for explaining the internal configuration of a simple synchronizing detection circuit according to the first embodiment.

DESCRIPTION OF THE PREFERRED EMBODIMENTS

A. First Embodiment

1. Related Art

Figure 6:
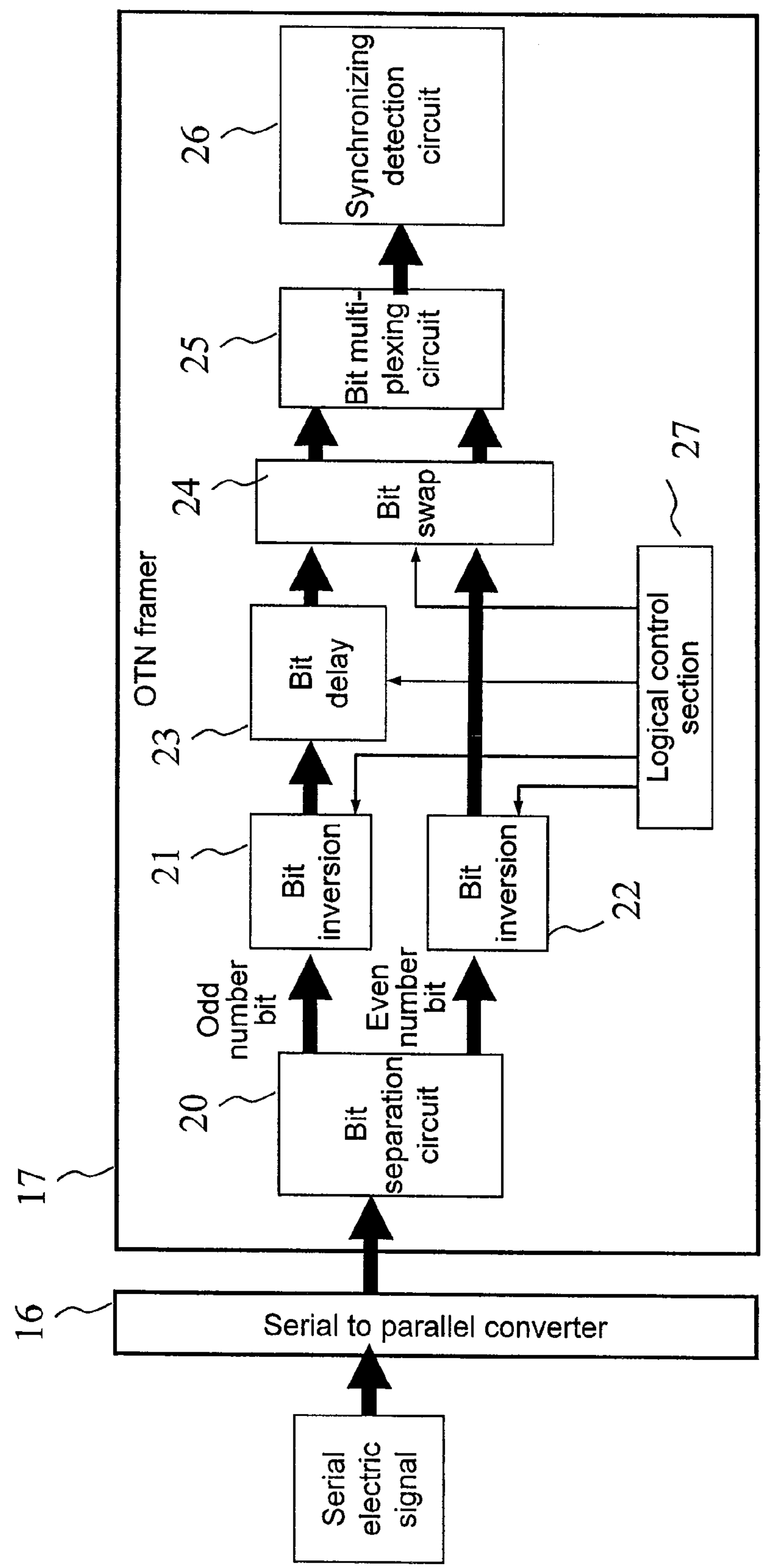
FIG. 6 is a configuration diagram of an OTN framer relevant to this embodiment.

FIG. 6 is a configuration diagram of an OTN framer relevant to this embodiment.

In the OTN framer, specifically, a signal train parallelized is separated into an odd number part and an even number part in a bit separation circuit (20), a logical inversion circuit (21, 22) is provided on each of the odd number part and the even number part, and a one-bit delay circuit (23) for the odd number part and a bit swap circuit (24) between the odd number part and the even number part are provided to normalize the sequential state of the odd number part and the even number part, as shown in FIG. 6. The valid or invalid setting for each circuit is performed in a logical control section (27). Among the combinations ($2^4$=16 ways) of whether each logical operation circuit (21 to 24) is valid or invalid, a combination of producing a desired pattern in a synchronizing detection circuit (26) at the latter stage after re-multiplexing in a bit multiplexing circuit (25) is specified. Herein, a synchronizing pattern employs a fixed pattern like a frame synchronizing signal that is fixedly inserted on the sending side, such as a Frame Alignment Signal (FAS) byte (OA1=0xF6, OA2=0x28, FAS=[OA1][OA1][OA1][OA2][OA2][OA2]) in terms of an example of the OTN frame. The pattern of this FAS byte is defined based on the standards.

In decoding the optical signal of multi-valued modulation as in the DQPSK method, the synchronizing pattern detection circuit is single with an ordinary method, and performs a process for switching the logical operation circuits (21 to 24) in succession and specifying a combination of obtaining a desired synchronizing pattern from among the sixteen combinations in the synchronizing detection circuit (26). In this case, it takes a longer time to extract the synchronizing pattern, that is, establish the frame synchronization, than the decoding with the binary modulation method not requiring the logical operation as described above. Further, for a high speed signal of 40 Gbits/sec or more, the error correction of Forward Error Correction (FEC) with the OTN framer may be premised, but the FAS byte for use in detecting the synchronization of the OTN frame is ineligible for the FEC operation (usually, a bit string except for the FAS byte within a frame is a subject of operation in the FEC operation). Accordingly, for determination of the synchronizing detection in conjunction with the operation process in 16 ways as described above, there is possibility of causing a delay in synchronizing establishment or a false detection of synchronization due to an error in the FAS byte. Especially when the signal mapped to the OTN frame is restricted in the switching time between the operation system and stand-by system like SONET/SDH, a delay taken till the synchronization establishment may become an obstacle.

2. Network

Figures 8A, 8B:
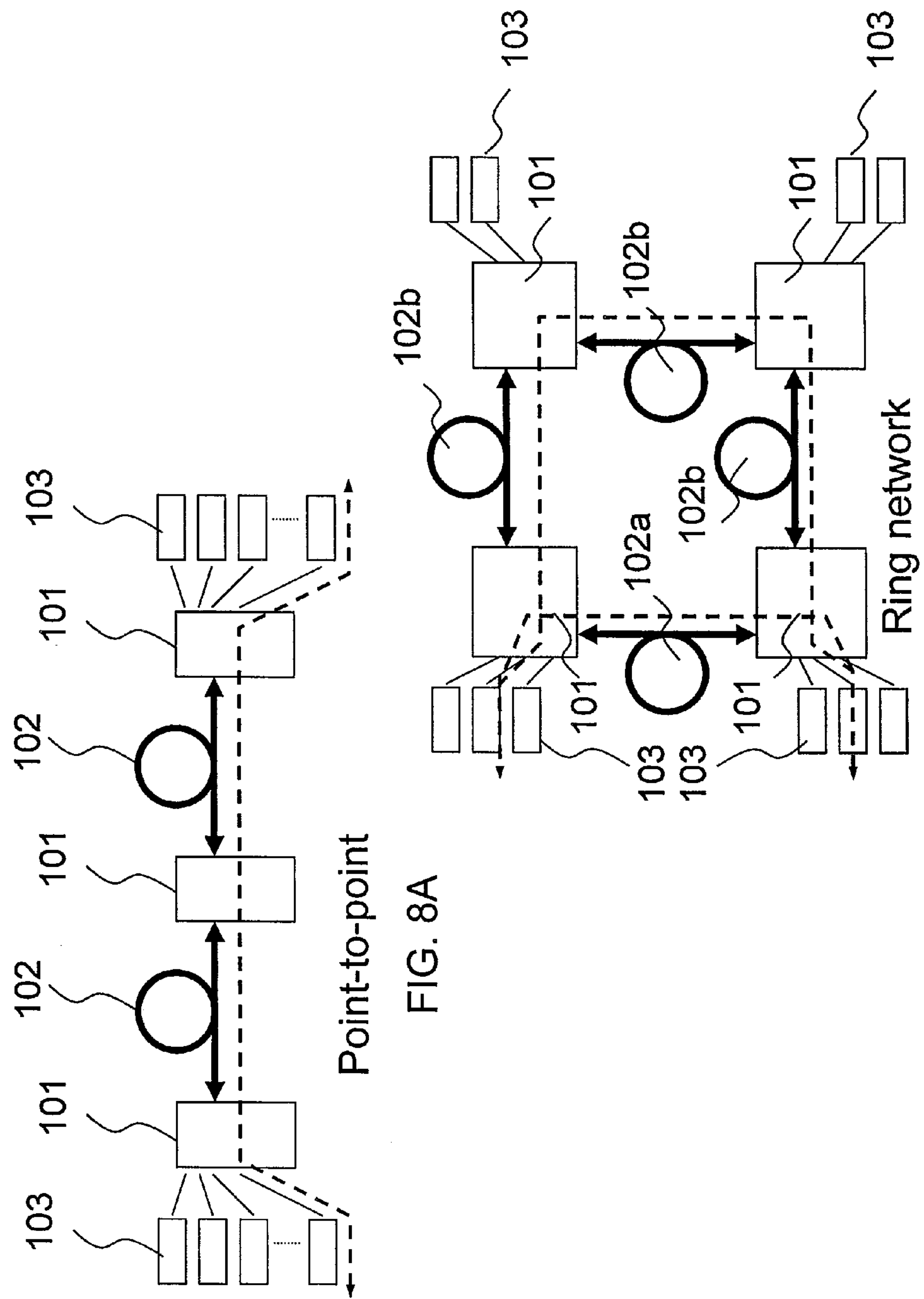
FIGS. 8A and 8B are diagrams for explaining a network configuration according to the first embodiment.

FIGS. 8A and 8B are diagrams for explaining a network configuration according to the first embodiment.

FIG. 8A shows a point-to-point network configuration in which optical nodes (101) are connected by an optical fiber (102). Each optical node (101) is connected to a plurality of external communication devices (103) represented by a router. That is, among the plurality of external communication devices represented by the router, it is possible to implement the communication between the distant communication devices at remote sites via this optical network. In the optical nodes (101) at both ends, a plurality of electric signals are converted into a plurality of optical signals and transmitted, and a plurality of optical signals are received and converted into a plurality of electric signals. That is, the optical node is composed of a WDM apparatus that performs transmission and reception by synchronizing or splitting a plurality of signals having different wavelengths. Also, in an intermediate optical node (101), a part of a plurality of optical signals may be transmitted (add) or received (drop). That is, the optical node (101) may be composed of a so-called optical add/drop apparatus (OADM).

FIG. 8B shows an example of a ring type network configuration with a redundant structure. Each optical node (101) similarly comprises the WDM apparatus or OADM apparatus, in which the redundant structure for an operation system and a stand-by system is built by two optical fiber paths (102*a*, 102*b*). Herein, if there is a failure in the optical fiber path for the operation system, switching to the stand-by system occurs.

Figure 9:
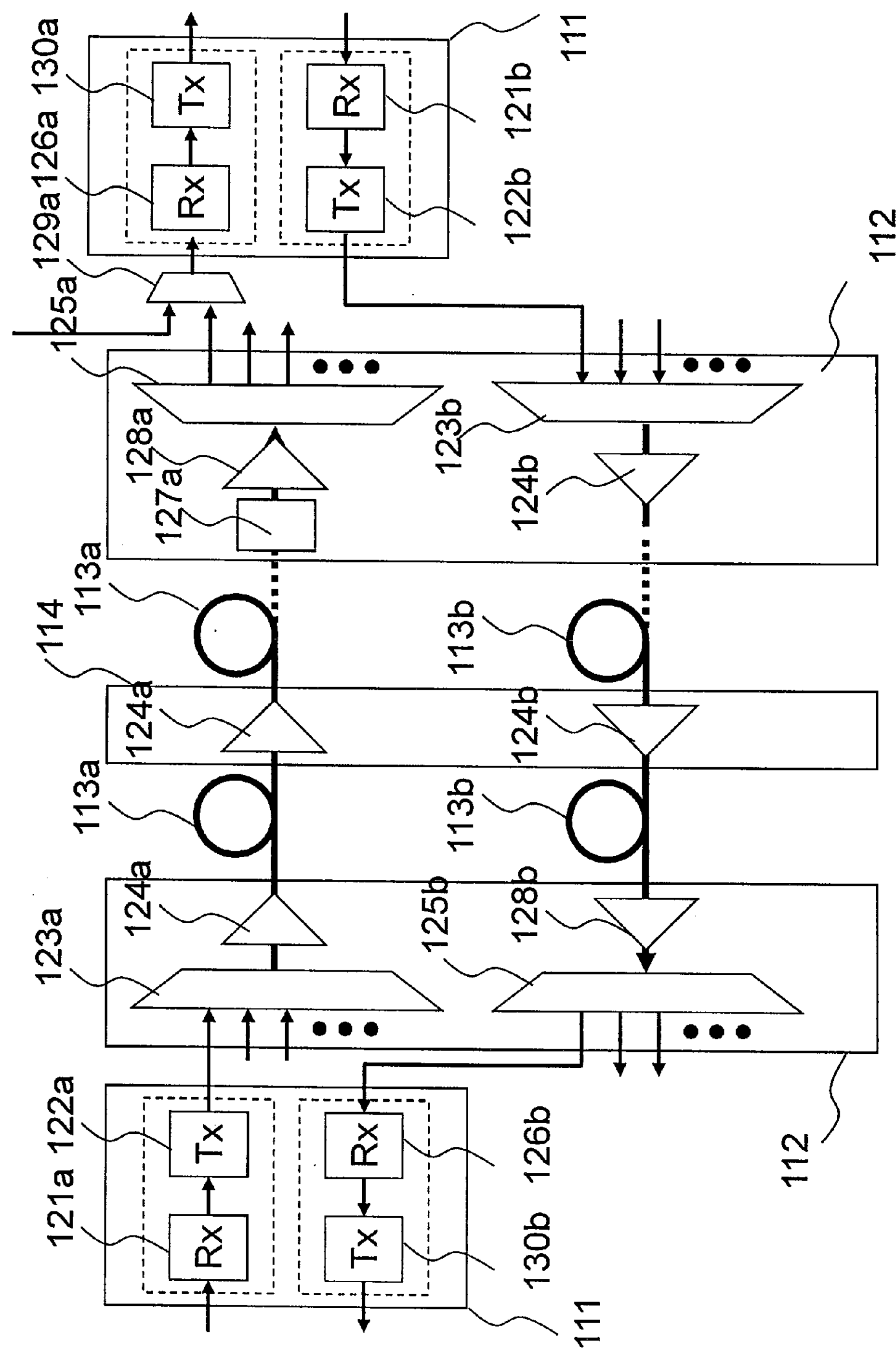
FIG. 9 is a diagram for explaining the configuration of a WDM apparatus according to the first embodiment.

FIG. 9 is a diagram for explaining the configuration of the WDM apparatus constituting the optical node (101) in FIG. 8. The WDM apparatus mainly comprises a transponder (111), a WDM transmitting/receiving apparatus (112), an optical fiber (113), and a WDM repeating installation (114). The external communication devices such as router are connected to the transponder (111). The signal flow will be described in the following. A signal from the external communication device is received by a local receiver (121*a*) inside the transponder (111), subjected to frame conversion, error correction coding and optical modulation according to the specifications of the WDM, and outputted from a WDM transmitter (122*a*) at a wavelength of an appropriate grid on the WDM side. These signals are integrated, and subjected to wavelength multiplexing by a wave synthesizer (123*a*) to form a WDM signal, which is incident through a light amplifier (124*a*) on an optical fiber (113*a*). If the optical fiber (113*a*) is long, the WDM repeating installation (114) is inserted timely to restore the decreased optical power. The WDM signal reaching the WDM transmitting/receiving apparatus (112) on the opposite side is split into individual wavelengths by a band splitter (125*a*) to reach a WDM receiver (126*a*) inside the transponder (111). Each WDM signal is corrected for dispersion by a variable dispersion compensator (127*a*) and corrected for the optical level by a light amplifier (128*a*) at the former or latter stage of the band splitter (125*a*) depending on a degradation factor in the transmission path.

Also, if a redundant structure is built as shown in FIG. 8B, an optical selector (129*a*) can be placed between the band splitter (125*a*) and the transponder (105) to switch between the operation system and the stand-by system. In the WDM receiver (126*a*), the optical demodulation (conversion into an electric signal) according to the modulation method, decoding of the error correcting code, and framing suitable for the external device are made, and the electric signal is outputted from a local transmitter (130*a*) to get to the external communication device. Similarly, the flow of a counter signal from right to left (signal from 121*a* to 130*b*) in the figure is also the same.

The operation of the WDM optical receiver (126*a*) inside the transponder (111) using the DQPSK modulation method will be described again with reference to FIG. 5. The optical signal (10) reaching the WDM optical receiver is split 1:2 by the band splitter (11), and the optical signals after splitting are converted into two electric analog signals by two delay interferometers A, B (12A, 12B) and two balance photodiodes (13A, 13B). With the electric analog signals, the CDR circuits (14A, 14B) make the extraction of the clock and restoration (digitization) of analog data by a discriminator. Two digital signals outputted from the CDR circuits (14A, 14B) are multiplexed (interleaved), alternating between the output of a CDR circuit A (14A) and the output of a CDR circuit B (14B), in the multiplexer (15), and decoded into the serial electric signal of 40 Gbits/sec. Thereafter, the electric signal is parallelized accordingly to the operation speed of the latter stage circuit by the serial to parallel converter (16), and subjected to termination of the OTN frame, error correction and extraction of the payload area (signal information to be transmitted) in the OTN framer (17). In the electric signal decoded at this time, the polarity of bit extracted by each CDR and the context of the outputs of the CDR circuits (14A, 14B) are unknown.

3. Receiving Apparatus

Figure 7:
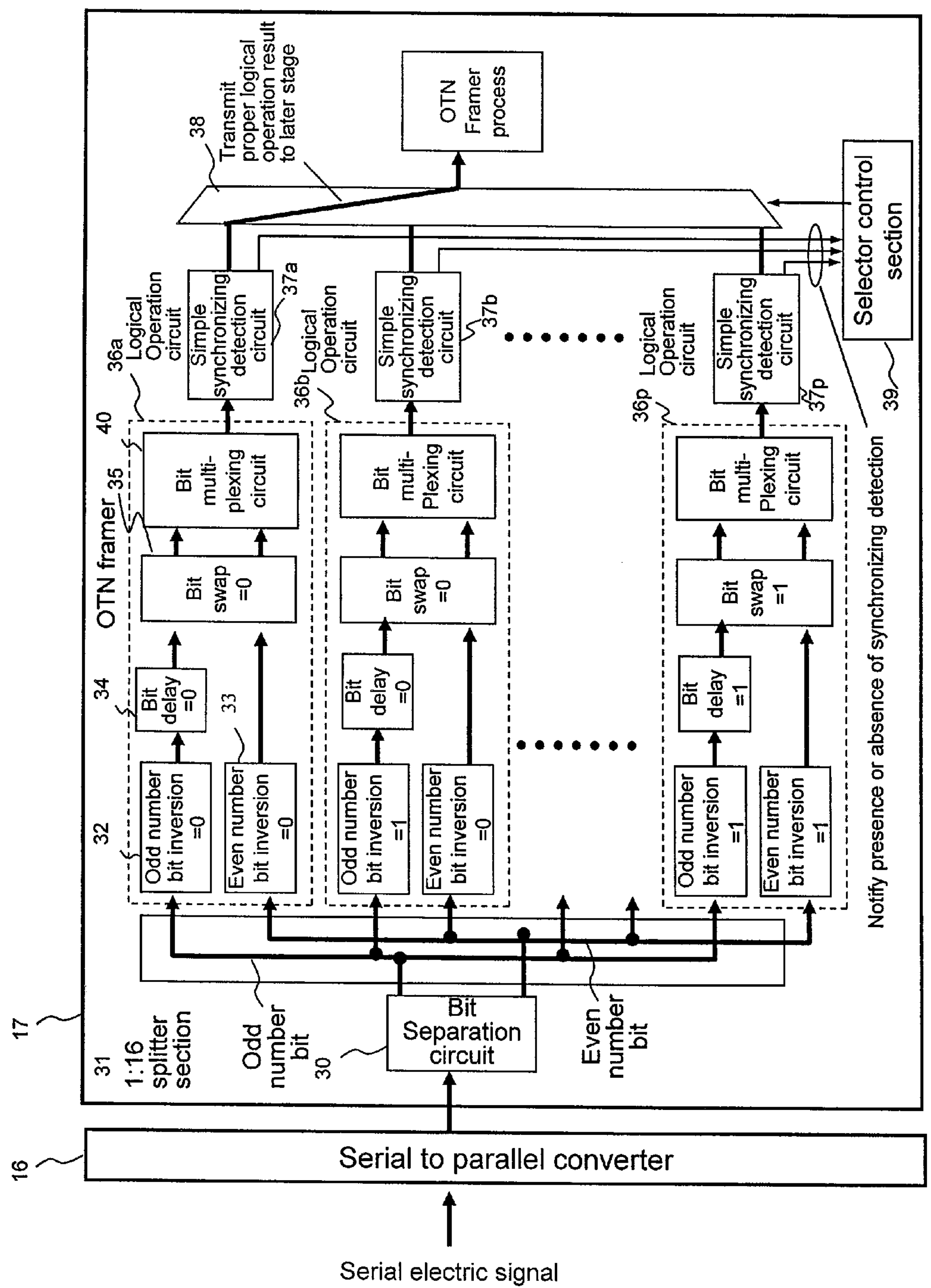
FIG. 7 is a diagram of a circuit configuration example according to a first embodiment.

FIG. 7 is a diagram of a circuit configuration example according to the first embodiment.

The OTN framer 17 comprises a bit separation circuit (30) for separating parallel electric signals into the odd number part and the even number part, and a 1:16 splitter section (31) for splitting the signal into 1:16, and further a logical operation circuit (36*a* to 36*p*) having different combination of a logical inversion (32, 33) for the odd number part and the even number part, a one-bit delay (34), a bit swap (35) and a bit multiplexing circuit (40), a simple synchronizing detection circuit (37*a* to 37*p*) at the latter stage, and a selector (38) for selecting any output of the sixteen simple synchronizing detection circuits (37*a* to 37*p*), in each of the sixteen circuits after splitting, as shown in FIG. 7. The synchronizing establishment detection state of the simple synchronizing detection circuits (37*a* to 37*p*) is notified to a selector control section (39), in which a selector control section (39) controls a selector (38) to select the output from the circuit in which the synchronization is established, and output it to a frame synchronizing and terminating circuit at the latter stage.

Also, as the transmission signal has higher speed, and the transmission path is longer, the transmission signal is more deteriorated and an error is more likely to occur. An FEC is employed to correct the error, but an FAS byte is a signal train needed to detect before the FEC correction, as previously described, whereby it is required that the synchronizing detection is made on the assumption that the FAS byte contains the error. Therefore, the simple synchronizing detection circuits (37*a* to 37*p*) are provided with a function of relieving or regulating the synchronization determination condition collectively for the sixteen circuits. In a state where the optical input into the receiving section is detected, and if the synchronizing establishment in all the simple synchronizing detection circuits (37*a* to 37*p*) is not detected, a function of relieving the synchronizing determination condition from the six byte collation of [OA1][OA1][OA1][OA2][OA2][OA2] to the two byte collation of [OA1][OA2], or to a circuit for permitting the bit error in the synchronizing collation pattern is provided. On the other hand, if the synchronizing detection state is duplicated in two or more simple synchronizing detection circuits, the synchronizing detection is taken out using any one circuit alone by regulating the synchronizing determination condition.

A circuit for determining the polarity of bit extracted in each CDR circuit and the context of the outputs of the CDR circuits A, B is installed, as shown in FIG. 7. The bit separation circuit (30), the 1:16 splitting circuit (31), the logical operation circuits (36*a* to 36*p*), the simple synchronizing detection circuits (37*a* to 37*p*), the selector (38), and the selector control section (39) are installed between the serial to parallel converter (16) and the OTN framer (17) of FIG. 5. That is, the above circuits may be provided in any of the serial to parallel converter (16), the OTN framer (17) and a single electronic device. Also, the signal may be processed in the multiplexer (15), in which case the bit separation circuit (30) of FIG. 7 is unnecessary. It is supposed in the following that the OTN framer comprises the relevant circuits.

The bit separation circuit (30) separates the signal into the odd number part and the even number part. Each separated signal train corresponds to an output signal of each of the two CDR circuits (14A, 14B) of FIG. 5. Assuming that the separated signal trains are (A) and (B), each signal of (A) and (B) is split in the 1:16 splitting circuit (31), and resulting signals are inputted into the parallel sixteen logical operation circuits (36*a* to 36*p*).

Figure 10:
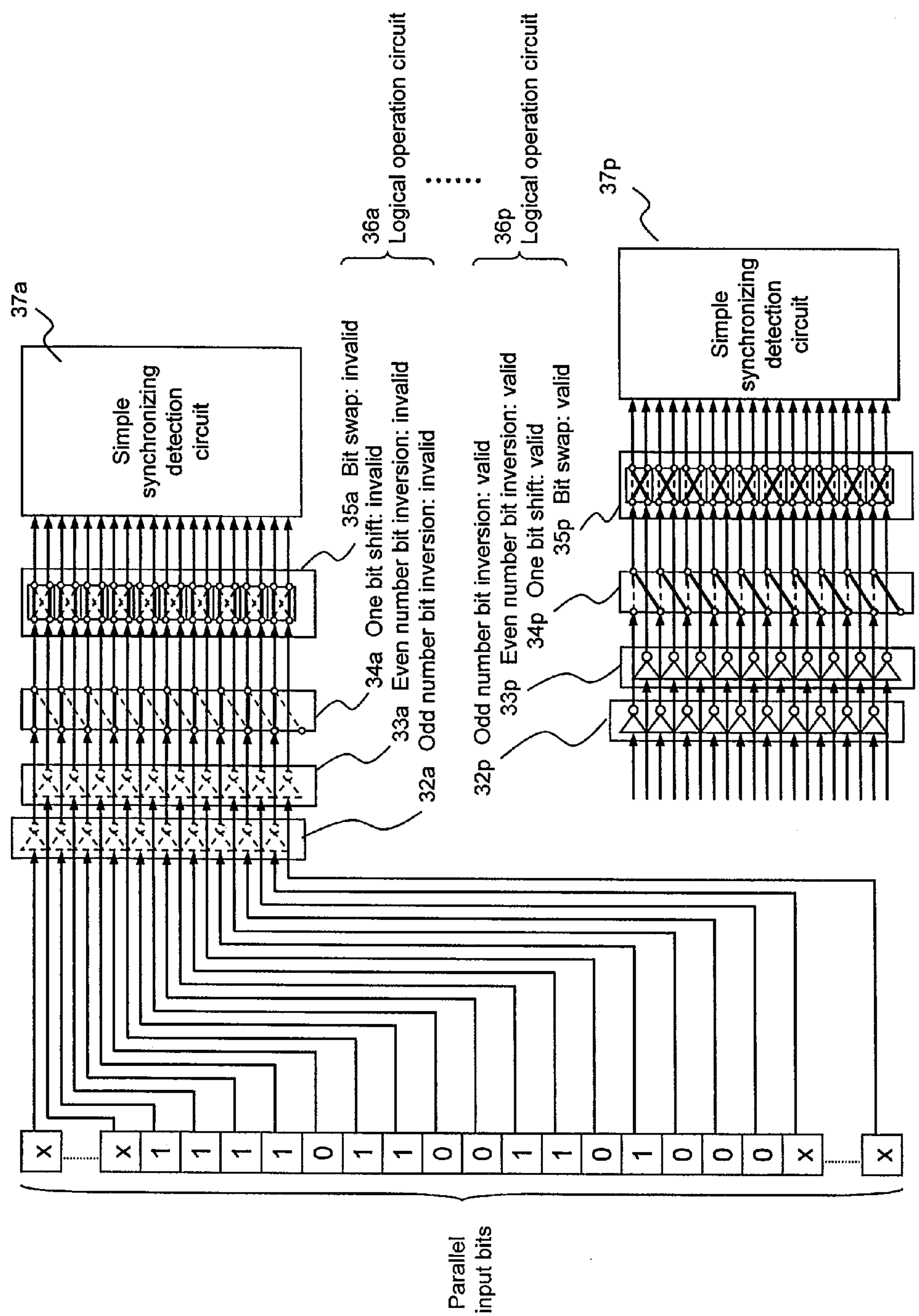
FIG. 10 is a diagram for explaining the internal configuration of a logical operation circuit according to the first embodiment.

FIG. 10 is an explanatory diagram showing the internal configuration of the logical operation circuits (36*a* to 36*p*). Each of the logical operation circuits (36*a* to 36*p*) is composed of the presence or absence of four logics including the logical inversion (32) for (A), the logical inversion (33) for (B), one-bit delay (34) for (A) and switching of order (swapping) (35) of (A) and (B) values. For example, the logical operation circuit (36*a*) has a combination of the logical inversion for (A)=none, the logical inversion for (B)=none, one-bit delay for (A)=none, and swap of (A) and (B)=none, and the logical operation circuit (36*p*) has a combination of the logical inversion for (A)=present, the logical inversion for (B)=present, one-bit delay for (A)=present, and swap of (A) and (B)=present. In the DQPSK method, a proper bit polarity and context can be taken out by the combination of four logics as previously described. Next, the simple synchronizing detection circuit (37*a* to 37*p*) is installed for each output of the logical operation circuits (36*a* to 36*p*), whereby a desired synchronizing collation pattern is detected for the signal after the logical operation in sixteen ways. In this example, the FAS byte in the OTN frame is employed as the synchronizing collation pattern. Each of the simple synchronizing detection circuits (37*a* to 37*p*) may pre-store the sixteen patterns as the synchronizing collation patterns, or may obtain the sixteen patterns at an appropriate timing such as the start-up from the combination of four logics as previously described, based on one pre-stored pattern.

FIG. 11 is an explanatory view for explaining the pattern after operation in the combinations of whether each of four logics in each logical operation circuit is valid or invalid.

Figure 17:
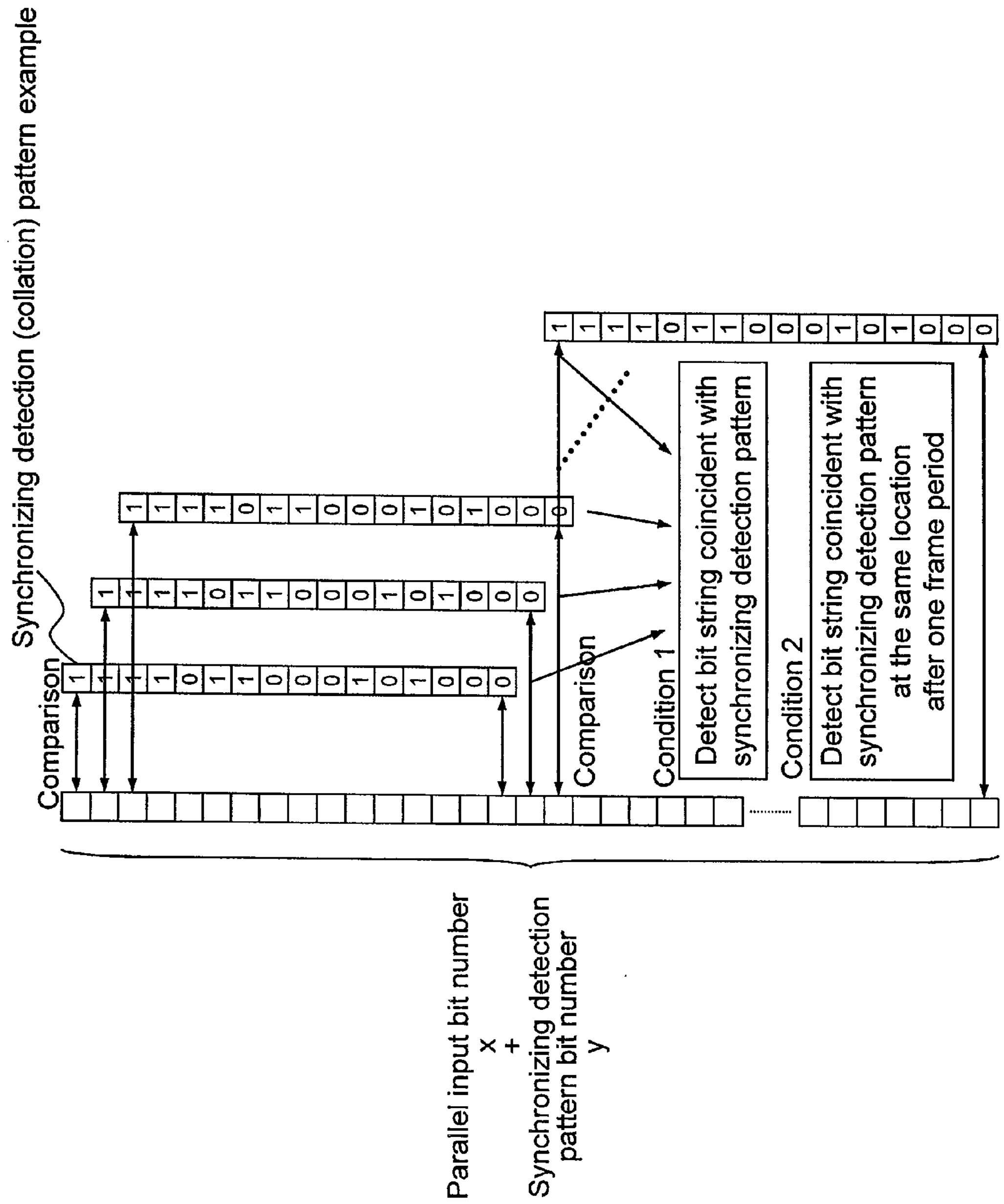
FIG. 17 is an explanatory view of the synchronizing detection (collation) pattern example in the simple synchronizing detection circuit.
Figure 18:
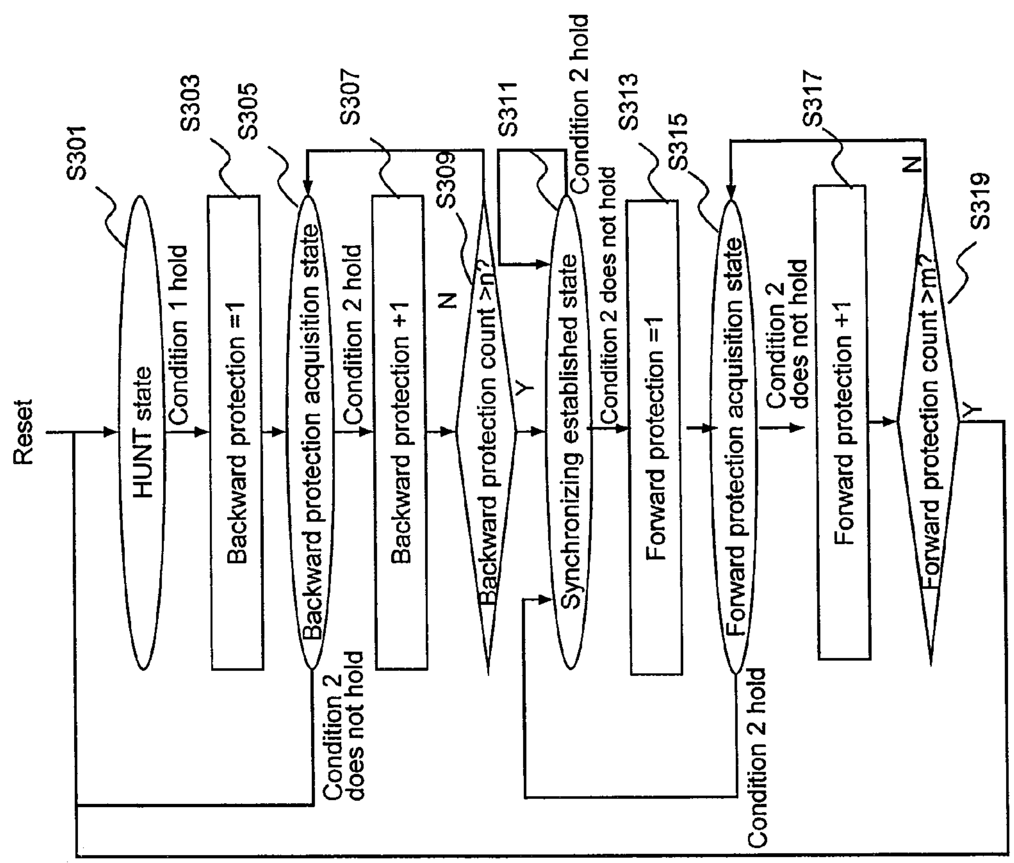
FIG. 18 is a flowchart of synchronizing detection.

FIG. 17 is an explanatory view of a synchronizing detection (collation) pattern example in the simple synchronizing detection circuits (37*a* to 37*p*). Also, FIG. 18 is a flowchart of synchronizing detection.

In this circuit, the FAS byte can be detected at any location in parallel input signals, and the detection of the FAS byte is monitored at a predetermined OTN frame period (e.g., 16320 byte/frame). Once detecting the FAS byte, the FAS byte is detected at m OTN frame period, and the operation transits to a synchronizing collation pattern detected state (S301 to S311: n stage backward protection). Also, if the FAS byte can not be detected n times consecutively at the same OTN frame period from the synchronizing collation pattern detection state, the operation transits to a synchronizing collation pattern undetected state (S311 to S319: m stage forward protection). The numbers of forward and backward protection stages m and n are arbitrary, but may be equally set to all the simple synchronizing detection circuits (37*a* to 37*p*). Each of the simple synchronizing detection circuits (37*a* to 37*p*) notifies the synchronizing collation pattern detected or undetected state to the selector control section (39). The selector control section (39) monitors the synchronizing collation pattern detected state from the sixteen simple synchronizing detection circuits (37*a* to 37*p*) and switches the selector (38) to a proper logic under the predetermined condition.

Figure 12:
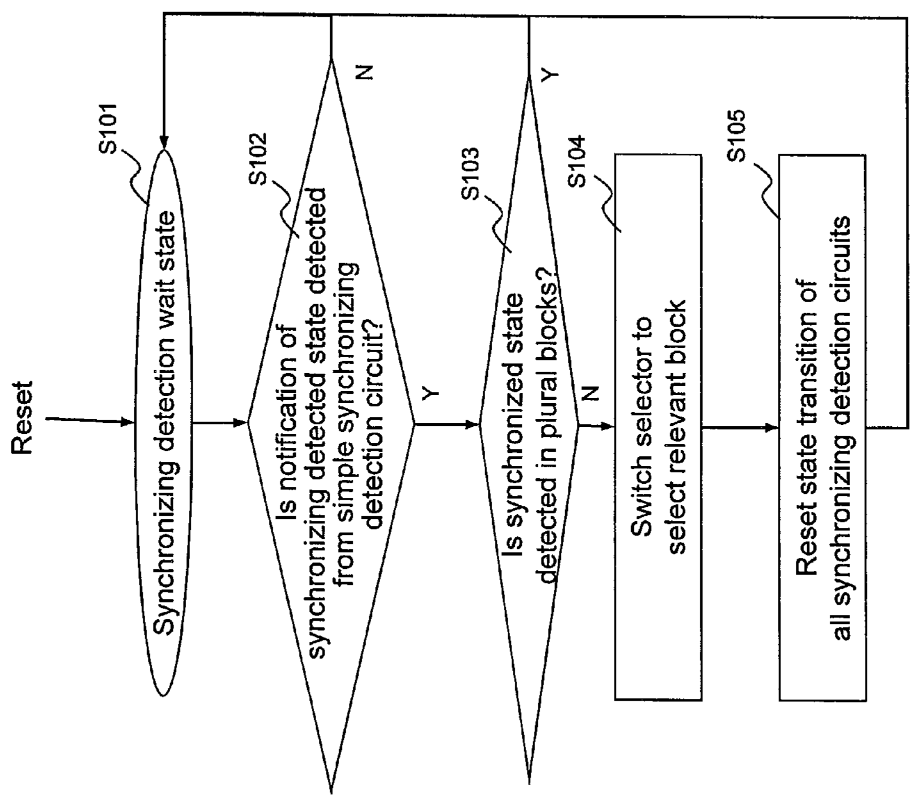
FIG. 12 is a control flowchart of a selector control section according to the first embodiment.

FIG. 12 is a flowchart showing the control contents of the selector control section (39).

The selector control section (39) holds the former states (S101 to S102) of the selector (38), if all the simple synchronizing detection circuits (37*a* to 37*p*) are in the synchronizing collation pattern undetected state. Also, the selector control section (39) does not switch the selector (38) even in a state (S103) where two or more simple synchronizing detection circuits detect the synchronizing collation pattern detected state. The selector control section (39) manipulates the selector (38) to select the relevant block in a state where only one block is in the synchronizing detected state through a predetermined number of protection stages (S104). Also, the selector control section (39) resets each of the simple synchronizing detection circuits (37*a* to 37*p*) once controlling the selector (38), to prevent the selector (38) from fluttering (S105).

A signal selected by the selector (38) becomes a proper bit array signal to be processed in the original OTN framer. The selected signal is discriminated for the OTN frame by the regular FAS synchronizing detection circuit, passed through an OTU (Optical Channel Transport Unit), an ODU (Optical Channel Data Unit), each overhead termination, and error correction by the FEC, and reproduced as the signal (data) to be transmitted to the outside.

With the above logics, it is possible to extract a proper signal array without delay even in the case of using the multi-valued modulation method such as the DQPSK method. It is expected that the logics also have the effect for the signal release time after switching the optical selector (129*a*) of FIG. 9 in the case where the redundant structure as shown in FIG. 8B is built.

B. Second Embodiment

Figure 1:
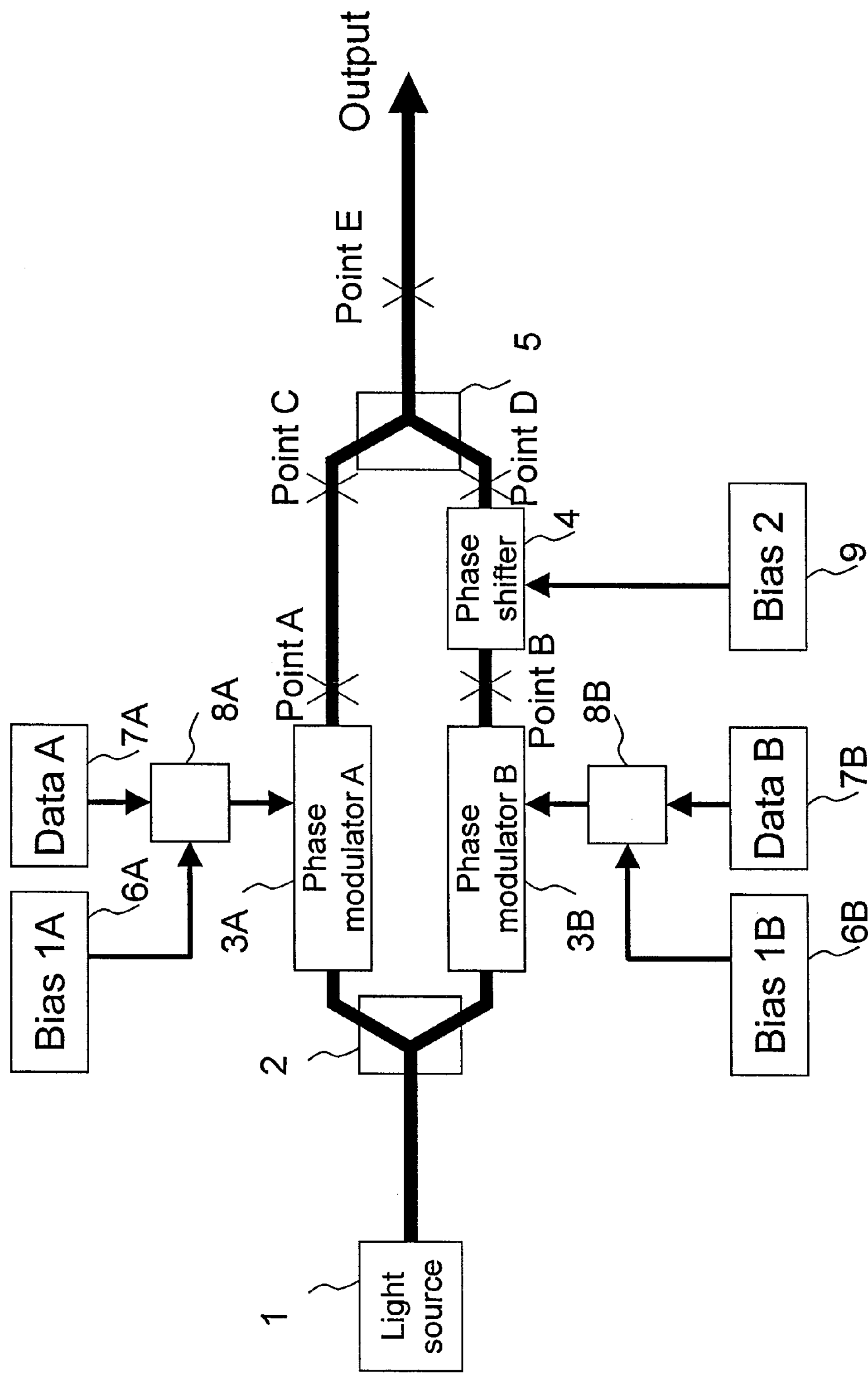
FIG. 1 is a configuration diagram of a quaternary phase modulation transmitter.
Figure 2:
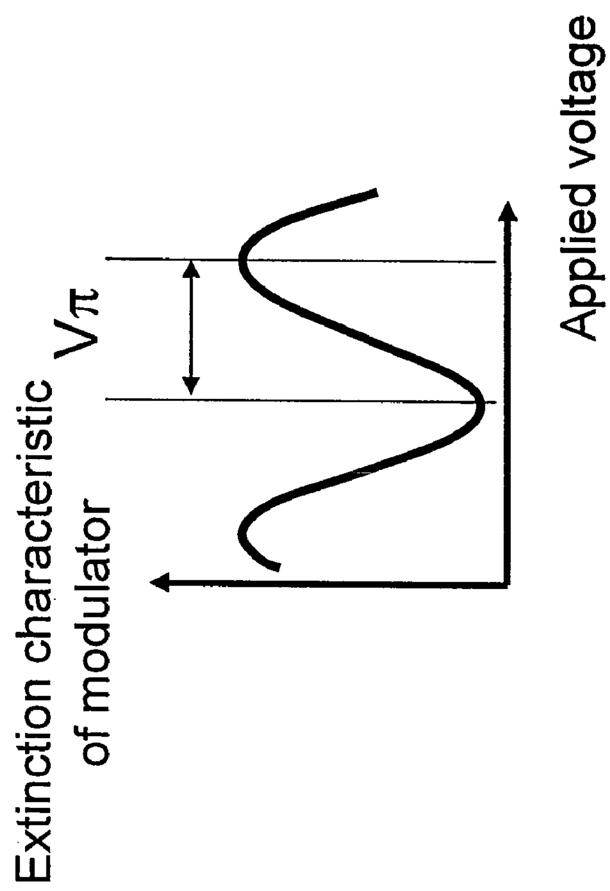
FIG. 2 is an explanatory view of an extinction characteristic for an MZ type modulator.
Figure 3:
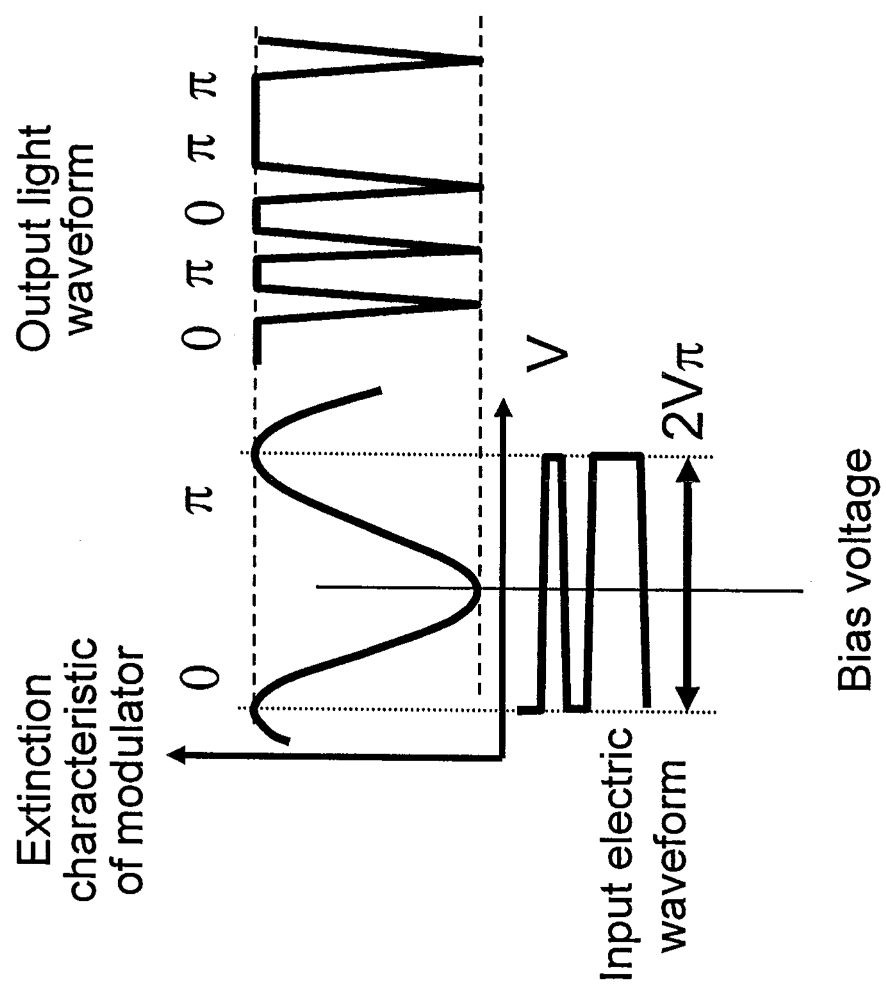
FIG. 3 is an explanatory view of an example of phase modulation in the MZ type modulator.
Figure 4:
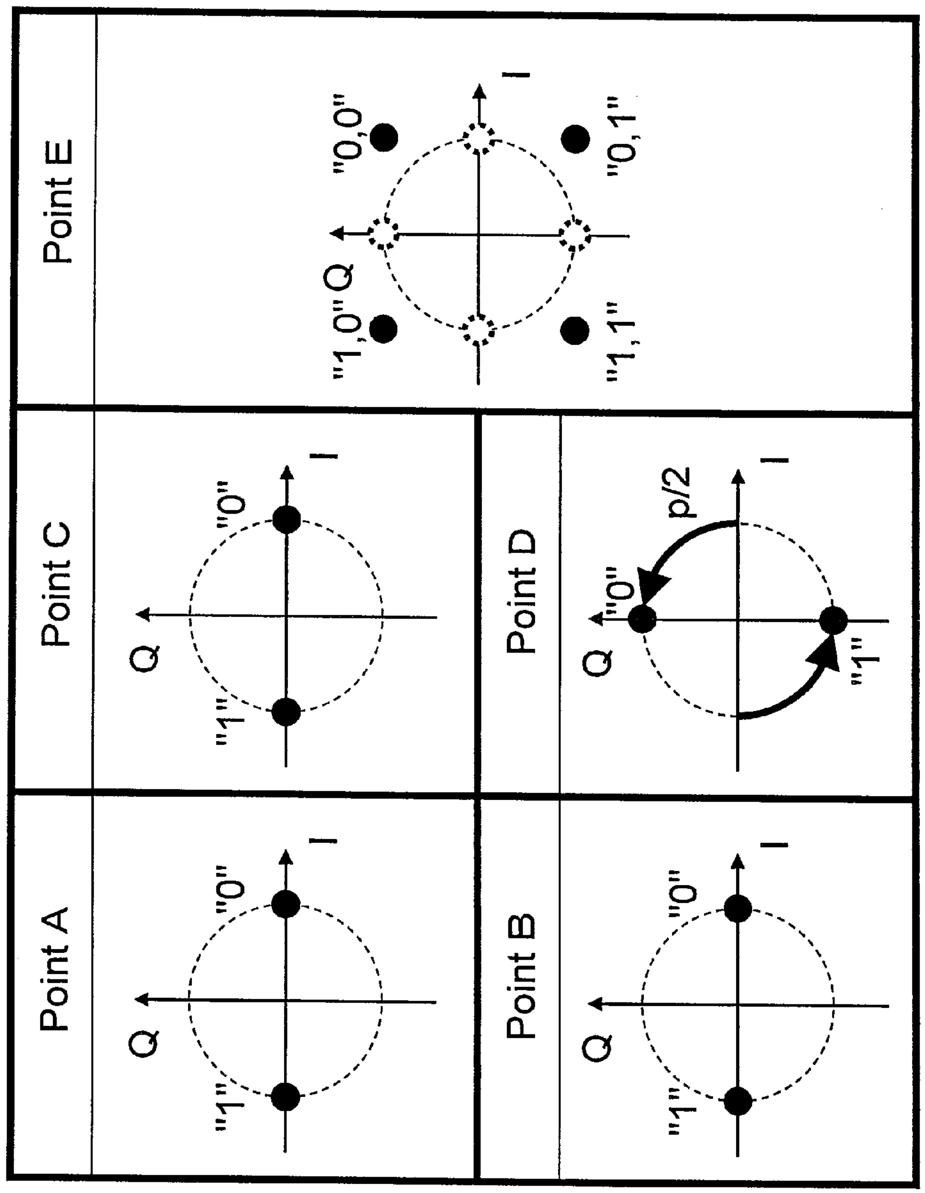
FIG. 4 is an explanatory view of an example of phase state in a quaternary phase modulator.
Figure 5:
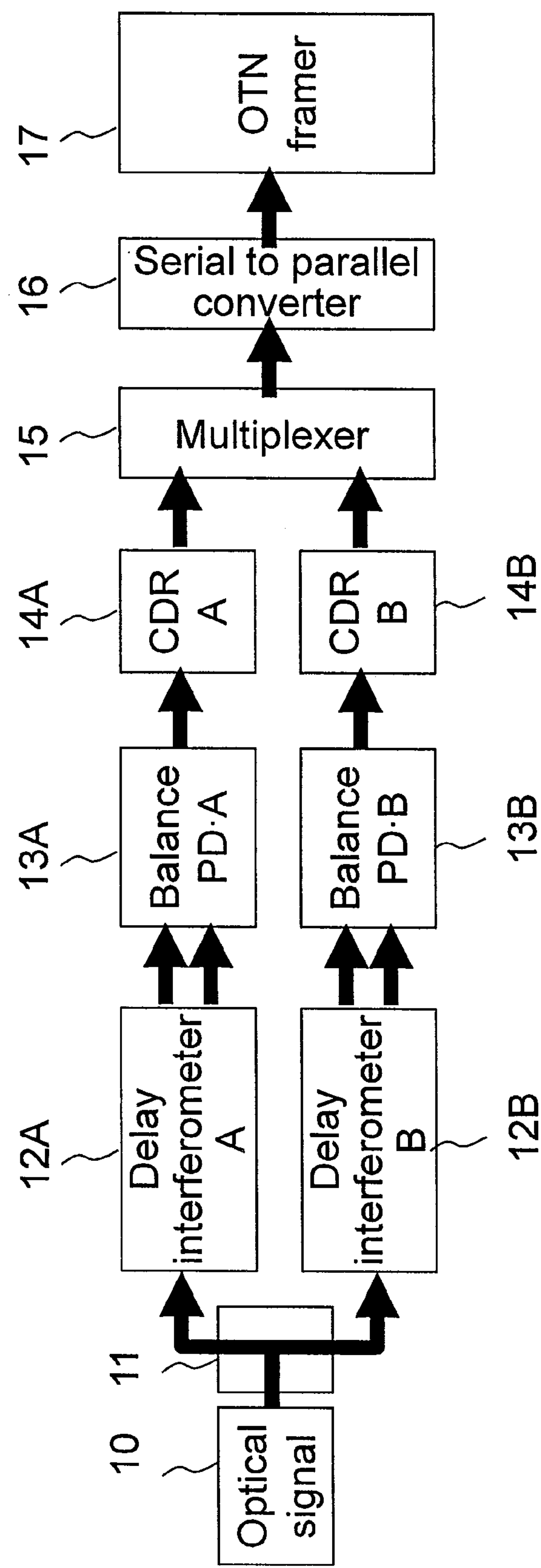
FIG. 5 is a configuration diagram of a quaternary phase modulation receiver.

A second embodiment of the invention will be described below. The overall configuration and the circuit configuration are shown in FIGS. 5 to 11. In FIG. 5, the input optical signal (10) may supposedly contain many bit errors depending on the load on the transmission path. It is expected that these bit errors can be subjected to error correction by the FEC after establishing the frame synchronization, although the FAS byte for use in the synchronizing detection is ineligible for the error correction. Accordingly, at the stage before the synchronizing establishment, it is not possible to discriminate whether a desired collation pattern can not be detected because of the suitability of the logical operation circuits (36*a* to 36*p*) of FIG. 7, or a desired collation pattern can not be detected due to signal degradation. Hence, the selector control section (39) of FIG. 7 is provided with a function of relieving the condition of synchronizing collation pattern in the simple synchronizing detection circuits (37*a* to 37*p*).

Figure 13:
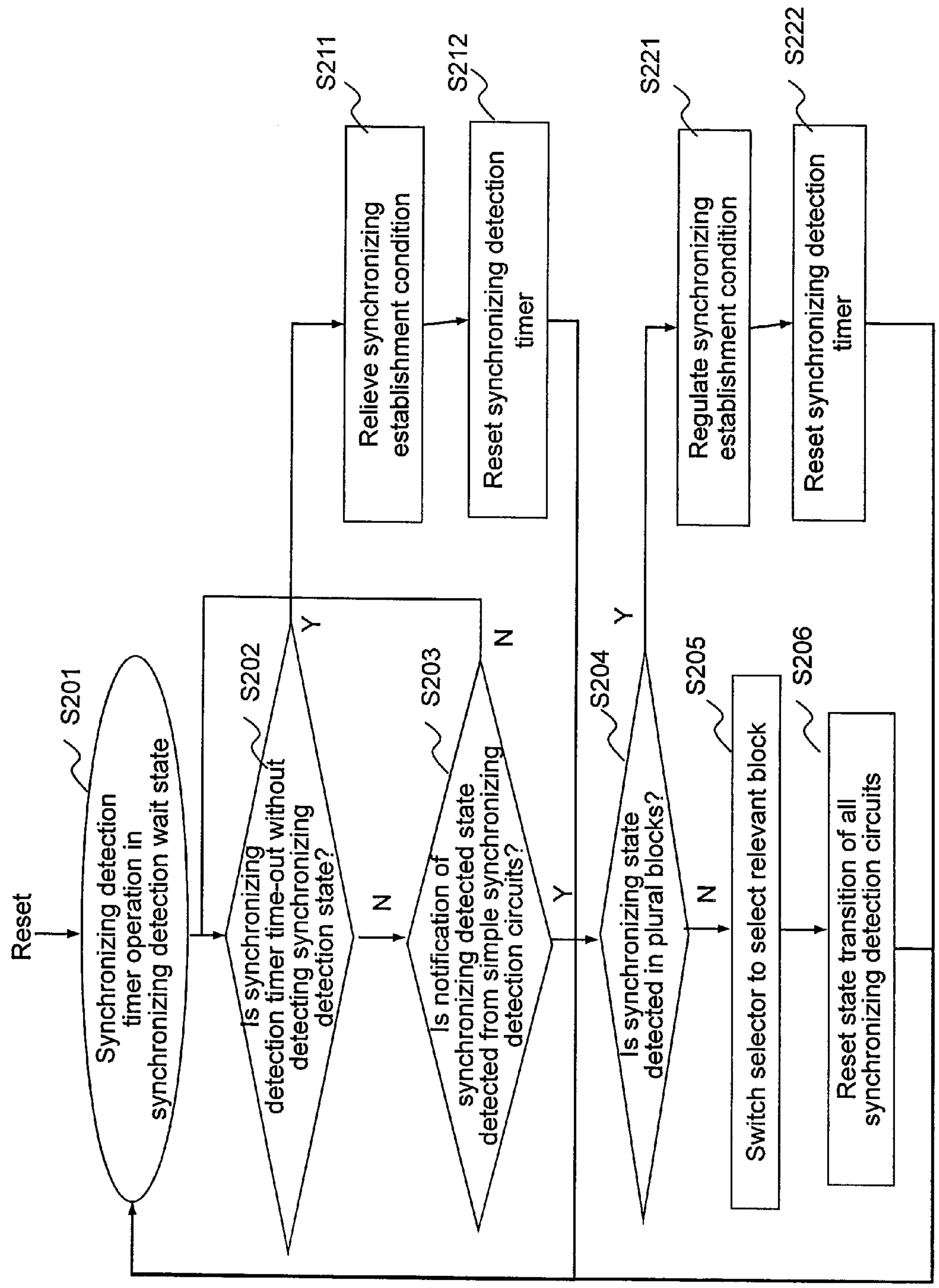
FIG. 13 is a control flowchart of a selector control section according to a second embodiment.

FIG. 13 is a control flowchart of the selector control section according to the second embodiment.

In the selector control section (39) of FIG. 7, if a synchronizing detected state can not be detected in any block of the simple synchronizing detection circuits (37*a* to 37*p*) (S201 to S202), the selector control section (39) is provided with a function of relieving the synchronizing determination condition of the simple synchronizing detection circuits (37*a* to 37*p*) (S211 to S212), as shown in FIG. 13. Herein, the synchronizing determination condition of the simple synchronizing detection circuits (37*a* to 37*p*) is relieved from the six byte collation of [OA1][OA1][OA1][OA2][OA2][OA2] to the two byte collation of [OA1][OA2], or to permit the bit error in the synchronizing collation pattern, for example. By relieving the condition in this way, if the synchronization can be detected in any one only of the simple synchronizing detection circuits (37*a* to 37*p*) (S203 to S204), the selector control section (39) controls the selector (38) of FIG. 7 in accordance with this condition. On the other hand, if the synchronizing detected state is duplicated in two or more simple synchronizing detection circuits (S203 to S204), the selector control section (39) regulates the synchronizing determination condition to detect the synchronization in only any one circuit (S221 to S222). For example, for the simple synchronizing detection circuits (37*a* to 37*p*), the condition is relieved from the two byte collation of [OA1][OA2] to the six byte collation of [OA1][OA1][OA1][OA2][OA2][OA2], or not to permit the bit error in the synchronizing collation pattern.

The selector control section (39) may relieve the frame synchronizing acquisition condition for notifying the detected state of a fixed pattern by shortening the fixed pattern that is the comparison signal train for acquiring the frame synchronization in the plurality of simple synchronizing detection circuits (37*a* to 37*p*), if the frame synchronization can not be acquired within a predetermined period of time in any of the simple synchronizing detection circuits (37*a* to 37*p*).

Also, the selector control section (39) may monitor the coincidence bit number with the comparison signal train for acquiring the frame synchronization and detect the normal electric signal array depending on whether the frame coincidence bit number of each of the simple synchronizing detection circuits (37*a* to 37*p*) is great or not in the plurality of simple synchronizing detection circuits (37*a* to 37*p*), if the frame synchronization can not be acquired in any of the simple synchronizing detection circuits (37*a* to 37*p*).

C. Third Embodiment

Figure 14:
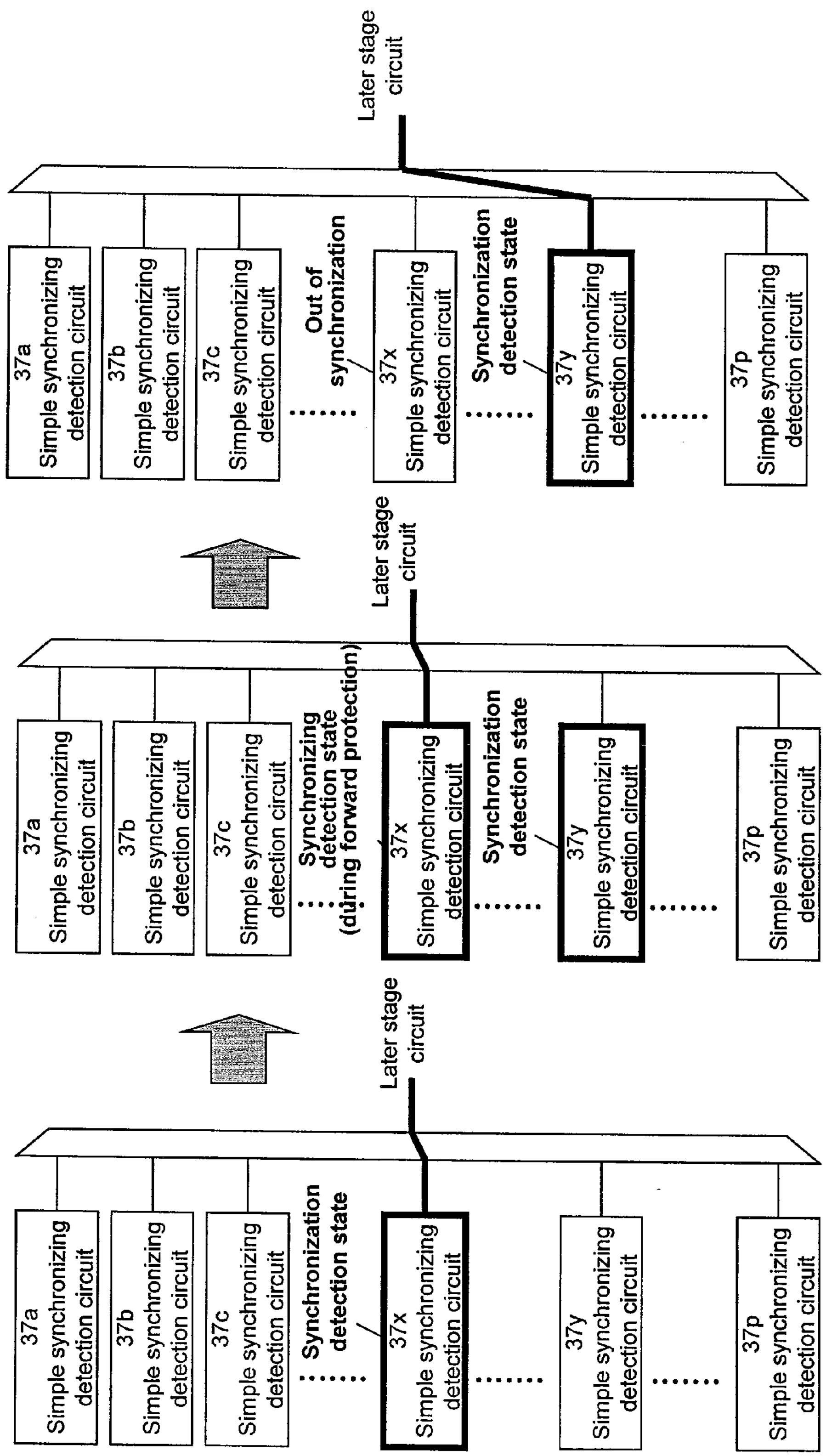
FIG. 14 is a diagram for explaining the configuration of a WDM optical receiver according to a third embodiment.

FIG. 14 is a diagram for explaining the configuration of a WDM optical receiver according to a third embodiment.

The third embodiment of the invention will be described below using FIG. 14. If the synchronization is once detected in any specific circuit (37*x*) of the simple synchronizing detection circuits (37*a* to 37*p*), the synchronizing detection is canceled in the selected circuit (37*x*) after the selector control section (39) controls the selector (38), and the synchronization is detected in the other simple synchronizing detection circuits (37*a* to 37*p*), there is a function that the selector control section (39) switches the selector to the circuit (37*y*) that is later detected for synchronization when an out of frame is detected, or during the forward protection, as shown in FIG. 14. Under the control of FIGS. 12 and 13, the selector control section (39) once controls the selector and is ready for control of the selector (38), whereby the switching to the desired logic is enabled. By providing this control, a state change after detecting the synchronization once, and a proper logic extraction after switching the optical selector (129*a*) of FIG. 9 are enabled.

D. Fourth Embodiment

Figure 15:
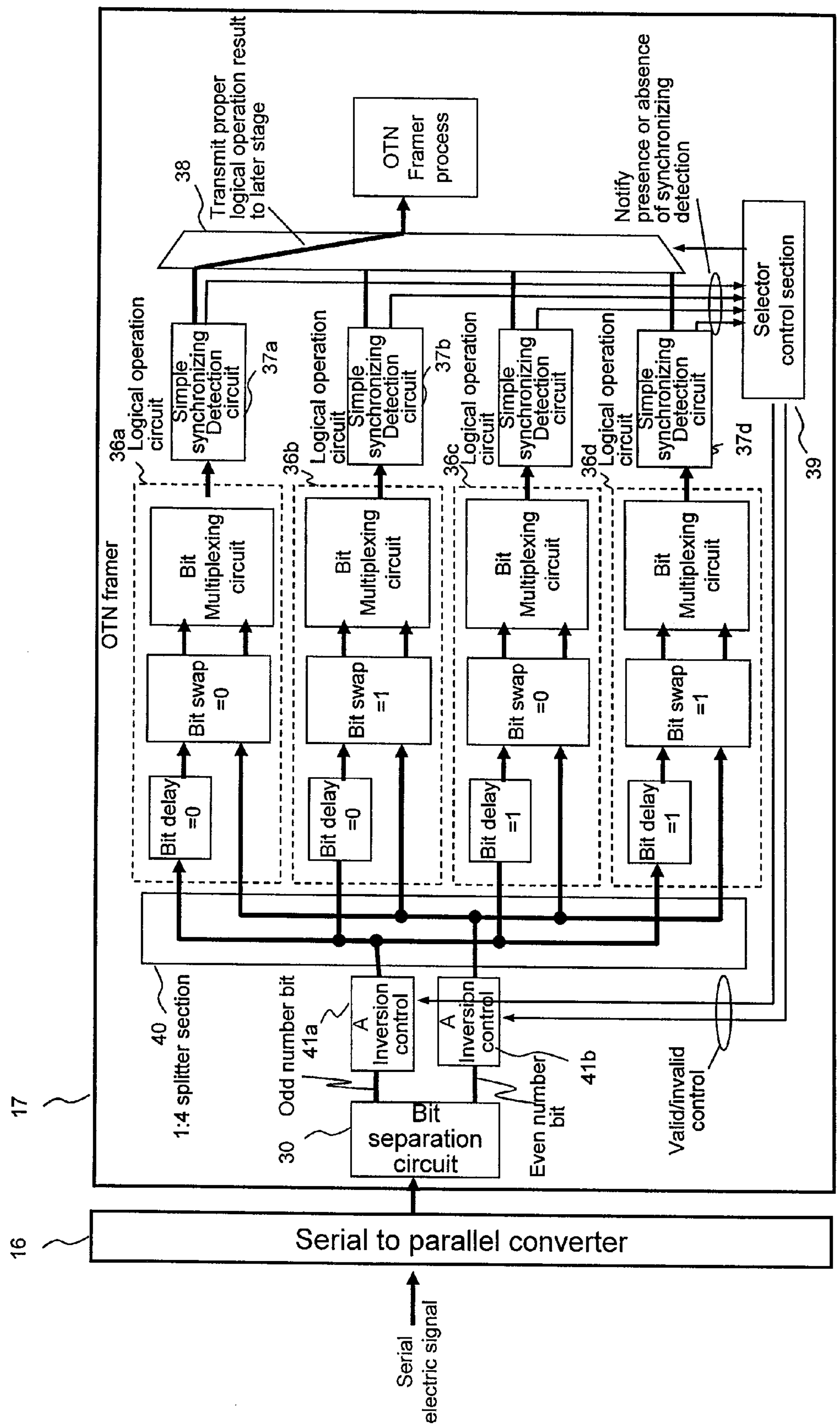
FIG. 15 is a circuit configuration diagram according to a fourth embodiment.

FIG. 15 is a circuit configuration diagram according to a fourth embodiment.

The fourth embodiment of the invention will be described below using FIG. 15. Though all the possible combinations of logics are provided in parallel using the 1:16 splitting circuit (31) in FIG. 7, the scale of the logic circuit for performing the operation according to this embodiment may be increased, because all the sixteen signals after splitting have a predetermined bit width (typically processed in 512 bits, for example). Hence, the splitting circuit is a 1:4 splitter section (40), and the parallel logic operation circuits (36*a* to 36*d*) of four logics have the combinations of the presence or absence of "bit delay" and "bit swap" as an example, as shown in FIG. 15. If the synchronization is not detected in any of the simple synchronizing detection circuits (37*a* to 37*d*) at the latter stage, the selector control section (39) controls the "odd number bit inversion" (41*a*) and the "even number bit inversion" (41*b*) in succession to specify the proper bit operation that can detect the synchronization in the simple synchronizing detection circuits (37*a* to 37*d*).

Though the above configuration is illustrative, it is possible to consistently reduce the logical circuit scale and expedite the synchronization establishment by combining the number of splitting to be parallel and the number (kind) of bit operations to be made collectively. For example, the logic operation circuits are provided in four ways of whether the bit delay or the bit swap is valid or invalid, but may not be limited to this, in which four kinds of logical operation circuits may be provided by selecting any two of the odd number and even number bit inversion, bit delay, and bit swap, and the remaining one circuit may be provided between the bit separation circuit (30) and the 1:4 splitter section (40).

E. Fifth Embodiment

Figure 16:
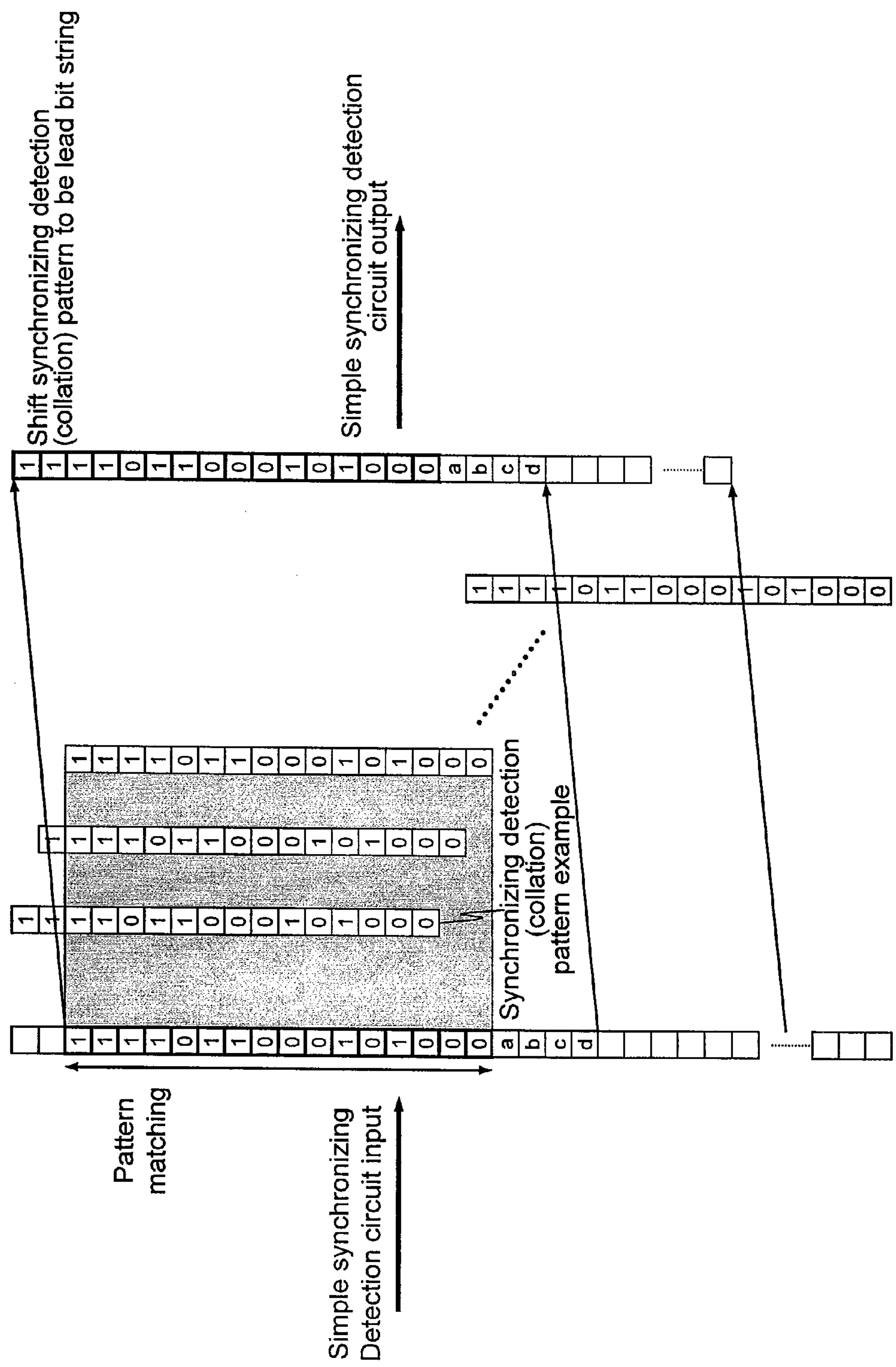
FIG. 16 is an explanatory view of a synchronizing detection (collation) pattern example in a simple synchronizing detection circuit according to a fifth embodiment.

FIG. 16 is an explanatory view of a synchronizing detection (collation) pattern example in the simple synchronizing detection circuit according to a fifth embodiment.

The fifth embodiment of the invention will be described below using FIG. 16. Though the simple synchronizing detection circuit as shown in FIG. 11 only determines whether or not a desired synchronizing (FAS) pattern exists in the input signal, a rearrangement (Align) circuit for shifting the synchronizing pattern to the top of bit string is provided in this simple synchronizing detection circuit, or between the simple synchronizing detection circuit and the selector. In each simple synchronizing detection circuit, the synchronizing pattern position before and after switching the selector can be unchanged by making the rearrangement to the bit array with the FAS pattern at the top. That is, it is possible to make switching to a proper logic without causing the out of frame in the transition state even by switching the selector.

The invention is applicable to various multi-valued modulation methods, in addition to the DQPSK method.

What is claimed is:

1. An optical signal receiving apparatus comprising:

a serial to parallel conversion section for parallelizing an electric signal array generated from an optical signal received and subjected to multi-valued phase modulation;

a bit separation circuit for separating the electric signal array parallelized by the serial to parallel conversion section into an odd number part and an even number part;

a splitter section for splitting each of the odd number part and the even number part outputted from the bit separation circuit into plural;

a plurality of logical operation circuits for making a logical operation on the odd number part and the even number part after splitting outputted from the splitter section;

a plurality of synchronizing detection circuits for detecting the detection state of a fixed pattern in parallel by comparing the output of each of the plurality of logical operation circuits with the fixed pattern for frame synchronization extracted from the received optical signal;

a selector for selecting the output from any of the plurality of synchronizing detection circuits; and a selector control section for controlling the selector to output a signal array outputted from the synchronizing detection circuit when detecting a notification of the detection state of the fixed pattern from the one synchronizing detection circuit.

2. The optical signal receiving apparatus according to claim 1, wherein the logical operation circuit makes a plurality of combinations of logical operation of whether the logical inversion of the odd number part is valid or invalid, whether the logical inversion of the even number part is valid or invalid, whether the one-bit delay is valid or invalid, and whether the bit swap between the odd number part and the even number part is valid or invalid, on the odd number part and the even number part after splitting outputted from the splitter section.

3. The optical signal receiving apparatus according to claim 1, wherein each of the plurality of logical operation circuits makes any of at least sixteen combinations of logical operation of whether the logical inversion of the odd number part is valid or invalid, whether the logical inversion of the even number part is valid or invalid, whether the one-bit delay is valid or invalid, and whether the bit swap between the odd number part and the even number part is valid or invalid, on the odd number part and the even number part after splitting outputted from the splitter section.

4. The optical signal receiving apparatus according to claim 1, further comprising a control section for making a logical operation on the odd number part and the even number part separated by the bit separation circuit, the control section provided between the separation circuit and the splitter section.

5. The optical signal receiving apparatus according to claim 4, wherein the control section makes the logical operation of logical inversion on the odd number part and the even number part separated by the bit separation circuit.

6. The optical signal receiving apparatus according to claim 4, wherein each of the plurality of logical operation circuits makes any of at least four combinations of logical operation of whether the logical inversion of each of the odd number part or the even number part is valid or invalid, whether the one-bit delay is valid or invalid, and whether the bit swap between the odd number part and the even number part is valid or invalid, except for combinations of logical operation set to be valid or invalid in the control section, on the odd number part and the even number part after splitting outputted from the splitter section.

7. The optical signal receiving apparatus according to claim 1, wherein a synchronizing establishment state of each of the synchronizing detection circuits is notified to the selector control section, and the selector control section controls the selector to select one of the outputs from the synchronizing detection circuits with the synchronization established to output it to a frame synchronizing circuit and/or terminating circuit at the latter stage.

8. The optical signal receiving apparatus according to claim 1, wherein the selector control section relieves a frame synchronization acquisition condition for notifying the detection state of the fixed pattern by shortening the fixed pattern that is a comparison signal array for acquiring the frame synchronization in the plurality of synchronizing detection circuits, if the frame synchronization can not be acquired within a predetermined period of time in any of the plurality of synchronizing detection circuits.

9. The optical signal receiving apparatus according to claim 1, wherein the selector control section regulates a frame synchronization acquisition condition for notifying the detection state of the fixed pattern by extending the fixed pattern that is a comparison signal array for acquiring the frame synchronization in the plurality of synchronizing detection circuits, if the frame synchronization is acquired in the plurality of synchronizing detection circuits.

10. The optical signal receiving apparatus according to claim 1, wherein the selector control section monitors a coincidence bit number with the comparison signal array for acquiring the frame synchronization and detects a normal electric signal array depending on the frame coincidence bit number of each synchronizing detection circuit in the plurality of synchronizing detection circuits, if the frame synchronization can not be acquired in any of the plurality of synchronizing detection circuits.

11. The optical signal receiving apparatus according to claim 1, wherein the selector control section resets a synchronizing detection process of the other synchronizing detection circuits in the plurality of synchronizing detection circuits, if an electric signal array coincident with the fixed pattern is detected in any synchronizing detection circuit.

12. The optical signal receiving apparatus according to claim 1, wherein the selector control section switches the selector to the other synchronizing detection circuits, if detecting the out of frame in the selected synchronizing detection circuit after selecting a normal electric signal array in the selector and detecting the frame synchronization in the other synchronizing detection circuits.

13. The optical signal receiving apparatus according to claim 1, wherein one or more the synchronizing detection circuits detects an FAS byte at any location in the parallelized input electric signal array, monitors detection of the fixed pattern at a predetermined frame period thereafter, and once detecting the fixed pattern, detects the fixed pattern at m-frame period, thereby making an m-stage backward protection transiting to a synchronizing collation pattern detected state, and/or making an n-stage forward protection transiting to a synchronizing collation pattern undetected state if the fixed pattern can not be detected n times consecutively at the same frame period from the synchronizing collation pattern detected state.

14. The optical signal receiving apparatus according to claim 1, wherein a rearrangement circuit is further provided between the synchronizing detection circuit and the selector, or inside the synchronizing detection circuit, to make the rearrangement to the bit array with the fixed pattern at the top.

* * * * *